Figure 1:
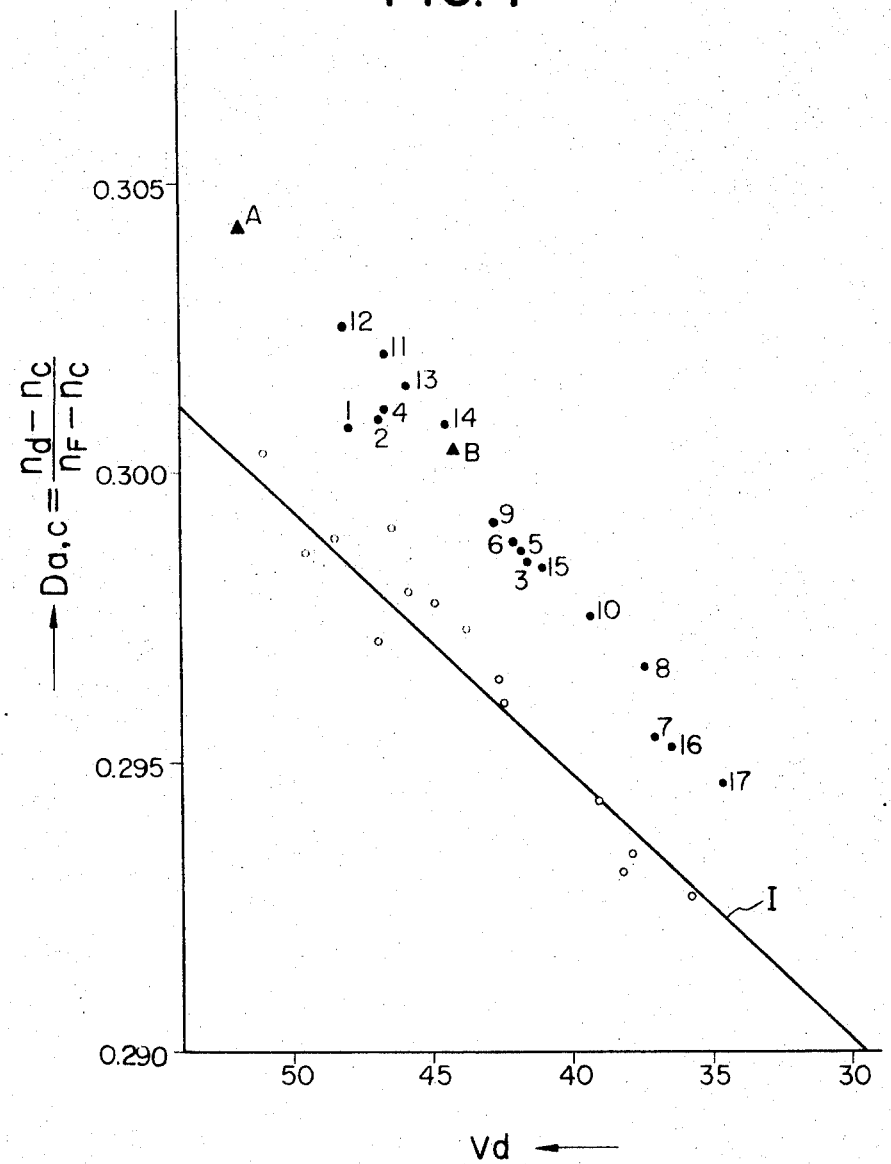

United States Patent

Tsunekawa

[15] 3,653,933

[45] Apr. 4, 1972

[54] ANOMALOUS DISPERSION OPTICAL GLASS HAVING A GOOD WEATHER PROOF CHARACTERISTIC

[72] Inventor: Munehisa Tsunekawa, Tokyo, Japan
[73] Assignee: Nippon Kogaku K.K., Tokyo, Japan
[22] Filed: Aug. 22, 1969
[21] Appl. No.: 852,381

[30] Foreign Application Priority Data

Aug. 31, 1968 Japan...................................43/62125

[52] U.S. Cl. ..............................106/47 Q, 106/53, 106/54
[51] Int. Cl. ........................C03c 3/00, C03c 3/08, C03c 3/10
[58] Field of Search ...............................106/53, 47 R, 47 Q

[56] References Cited

UNITED STATES PATENTS

| | | | |
|---|---|---|---|
| 2,393,448 | 1/1946 | Armistead | 106/53 |
| 2,468,868 | 5/1949 | Danzin et al. | 106/53 |
| 3,069,294 | 12/1962 | Davis | 106/53 |
| 3,149,984 | 9/1964 | Faulstich | 106/53 |
| 3,493,405 | 2/1970 | Thomas | 106/53 |

FOREIGN PATENTS OR APPLICATIONS

| | | | |
|---|---|---|---|
| 783,110 | 9/1957 | Great Britain | 106/53 |

OTHER PUBLICATIONS

Morey; G. W., The Properties of Glass, New York, Reinhold Publishing Corporation, 1954, pgs. 442–443

*Primary Examiner*—Daniel E. Wyman
*Assistant Examiner*—M. Bell
*Attorney*—Joseph M. Fitzpatrick, John Thomas Cella, Charles B. Cannon, Lawrence F. Scinto, Carroll G. Harper, Charles W. Bradley, Edwin T. Grimes, William J. Brunet and Robert L. Baechtold

[57] ABSTRACT

This invention provides an anomalous dispersion optical glass having a good weatherproof characteristic, in which the composition (mixing composition) range of the glass in weight percent is essentially as follows:

$B_2O_3$     10 ~ 40
$SiO_2$     3 ~ 45
$SiO_2 + 25 \geq B_2O_3 \geq 30\frac{1}{2} SiO_2$
$Al_2O_3$     8 ~ 12
$PbO$     25 ~ 60 and a portion of PbO is replaced with 0 ~ 8 weight percent of $La_2O_3$ and/or RO when desired, and, a portion of PbO is replaced with at least 3 weight percent of $La_2O_3$ and/or CaO when $B_2O_3 > SiO_2 + 20$ is satisfied or when $SiO_2 + 20 \geq B_2O_3$ and $B_2O_3 \geq 35$ are both satisfied, and $N_d$ and $V_d$ lie within the ranges $N_d = 1.52 ~ 1.74$ and $V_d = 33 ~ 52$.

4 Claims, 2 Drawing Figures

ANOMALOUS DISPERSION OPTICAL GLASS HAVING A GOOD WEATHER PROOF CHARACTERISTIC

This invention relates to an optical glass of PbO - B$_2$O$_3$ - SiO$_2$ - Al$_2$O$_3$ system that has excellent optical characteristics and high resistance against weather (weatherproof characteristic) and to an optical glass derived from the said system by adding metal oxides such as La$_2$O$_3$ and/or CaO.

The borate glass has been an optical glass indispensable in the manufacture of super achromatic lens (apochromat) since it has the so-called anomalous dispersion when compared with the silicate glass.

One kind of the borate glasses is the lead borate glass and some lead borate glasses are available on the market. These kinds of glasses have a very poor chemical resistance, especially are poorly weatherproof, compared with common optical glass and cannot be put into practice at present. In other words these commercial optical glasses cannot meet optical design requirements at present because it is impossible to manufacture satisfactory optical lenses as a result of the so-called weathering produced after a polishing process or a coating process regardless of careful handling in each process of lens manufacture.

An object of this invention is to offer an optical glass that meets such requirements as an anomalous dispersion sufficient for optical design and a weatherproof characteristic sufficient to meet manufacturing requirements, by selecting the ingredients within certain limits.

The optical glass according to this invention has sufficient anomalous dispersion characteristics and good weatherproof characteristic, and no filmy weathering and can well be put to practical use. Contrary to this, the optical glasses available on the market have very poor weatherproof characteristic and cannot almost be put to practical use, although they have anomalous dispersion.

The glass according to this invention can be manufactured easily by common optical glass manufacturing methods. In other words, the glass can be melted in either of the clay crucible and platinum crucible or by continuous method. However, the method in which the glass is melted in platinum crucible or the continuous method using platinum is advantageous because it gives a homogeneous glass easily and colors the glass less.

This invention is based on optical glasses having the following composition (mixing composition) limits in weight per cent:

| | |
|---|---|
| B$_2$O$_3$ | 10–40 |
| SiO$_2$ | 3–45 |
| SiO$_2$ + 25 ≧ B$_2$O$_3$ ≧ 30½SiO$_2$ | (1) |
| Al$_2$O$_3$ | 8–12 |
| PbO | 25–60 | and, a portion of PbO can be substituted with 0 to 8 weight percent of La$_2$O$_3$ and/or RO. Moreover, it is effective to substitute at least 3 weight percent of La$_2$O$_3$ and/or CaO for a portion of PbO when the condition B$_2$O$_3$>SiO$_2$ + 20 is satisfied or when the conditions SiO$_2$ + 20 ≧ B$_2$O$_3$ and B$_2$O$_3$ ≧ 35 are both fulfiled simultaneously. Here RO denotes one of bivalent metal oxides except PbO such as MgO, CaO, SrO, BaO, ZnO, and CdO or their mixture.

The degree of anomalous dispersion is smaller and closer to that of the flint glass when the percentage of B$_2$O$_3$ is smaller than its range indicated in the above-mentioned composition ranges or when the percentages of SiO$_2$ and PbO exceed their ranges respectively. And the weather proof characteristic is much degraded when the percentage of B$_2$O$_3$ exceeds its range. Moreover, when the percentage of PbO is smaller than its range the dispersion of the glass becomes smaller, in other words, the Abbe number becomes greater. This is an undesirable thing in the optical design as described later. Al$_2$O$_3$ is an ingredient effective to improve the weatherproof characteristic of this kind of glass but causes devitrification when its percentage exceeds its range. Therefore, its practical range was determined as indicated above.

The above-mentioned inequalities shown by equation (1) are important in that they express the optimum condition of the combination of each ingredient and were derived from many experiments and measurements. When the amount of B$_2$O$_3$ exceeds (SiO$_2$ + 25) weight percent, the glass cannot be put into practice because of an extremely poor weatherproof characteristic, and when the amount of B$_2$O$_3$ is less than (30½ SiO$_2$) weight percent, the anomalous dispersion is degraded to a degree where the glass loses its feature to be a glass of this kind. Furthermore, the use of 0 to 8 weight percent of La$_2$O$_3$ and/or RO is advantageous not only in obtaining proper optical constants but also in improving further the weatherproof characteristic by its substitution for PbO, and the anomalous dispersion is not degraded when their amount is within the above-mentioned range. La$_2$O$_3$ is especially effective and, among the RO's, the oxides belonging to the A family are more effective than those belonging to the B family, particularly CaO has a great effect. See the tables summarizing the examples.

Results obtained from a detailed analysis of the affect of La$_2$O$_3$ and RO that a remarkable improvement in the weatherproof characteristic was obtained by substituting at least 3 weight percent of La$_2$O$_3$ and/or CaO for a portion of PbO when the inequality B$_2$O$_3$>SiO$_2$ + 20 of the above-mentioned composition ranges was satisfied or when both inequalities SiO$_2$ + 20 ≧ B$_2$O$_3$ and B$_2$O$_3$ ≧ 35 were satisfied at the same time.

It is generally known that the introduction of small amounts of ZrO$_2$ and TiO$_2$ improves the chemical resistance, and when they are introduced into the glass of this system, they tend to reduce the haze percent, which is described later. However, they tend to form a heterogeneous film on the surface of the glass which peels off later by repeated contact with moisture.

The optical glass of this invention obtained within the above-mentioned composition ranges has a refractive index Nd of 1.52 to 1.74 and an Abbe number Vd of 33 to 52.

Figure 2:
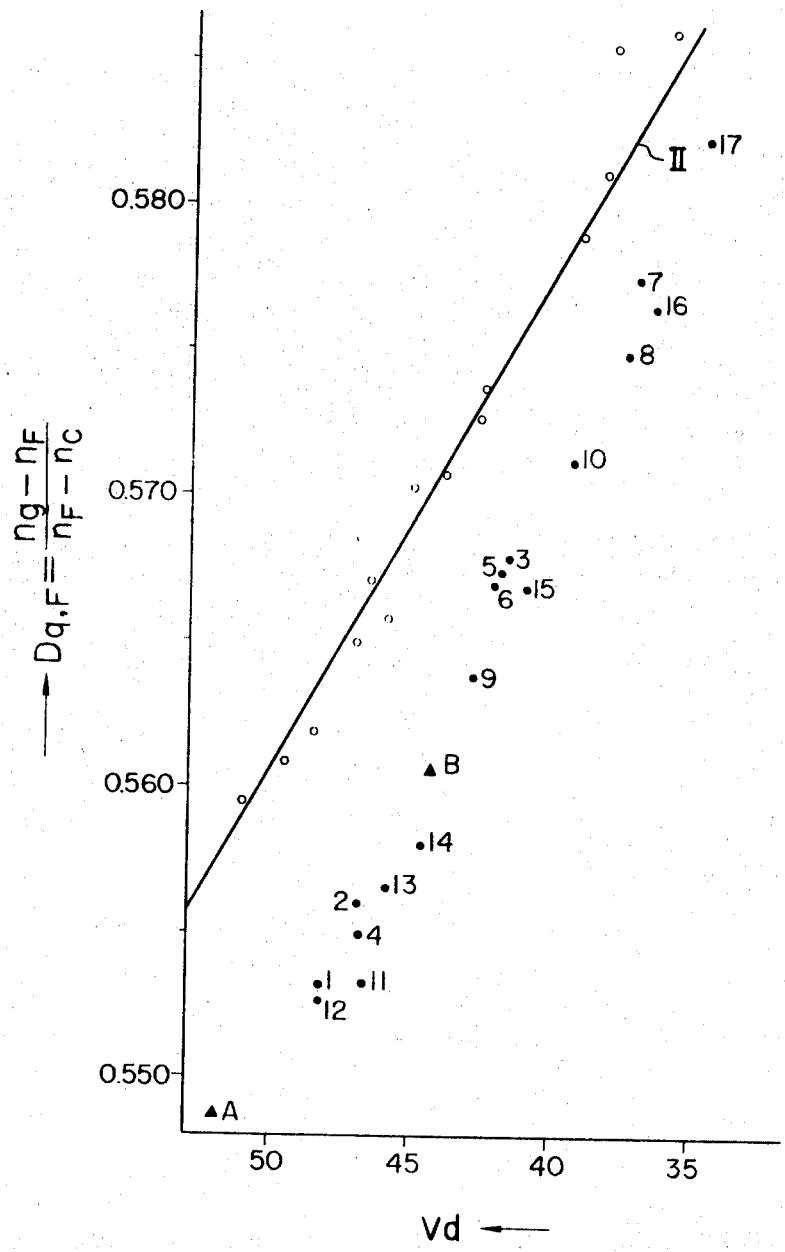

The anomalous dispersion and weatherproof characteristic will be described referring to the drawing, in which:

FIG. 1 is a drawing showing the relationship between the Abbe number V$d$ and partial dispersion ratio D$d$,C of the optical glass of this invention and normal optical glass; and FIG. 2 is a drawing showing the relationship between the Abbe number V$d$ and partial dispersion ratio D$g$,F of the optical glass of this invention and normal optical glass.

Generally speaking, when the partial dispersion ratio and the Abbe number of an optical glass are expressed by $$Dx, y = \frac{Nx - Ny}{N_F - N_C}$$

$$vd = \frac{Nd - 1}{N_F - N_C} \text{ respectively,}$$

where $ND$, $N_F$, and $N_C$ are the refractive indices against the $d$ line, F line, and C line, respectively and $Nx$, $Ny$ are the refractive indices against the lines having wavelengths $x$ and $y$ respectively, we obtain $$Dx,y = Ax,y + Bx,y \cdot vd + \Delta Dx,y \qquad (2)$$

Here, $Ax,y$ and $Bx,y$ are constants which only depend on the wavelength $x$ and $y$ and not on the composition of the glass. $Dx,y$ represents the degree of anomalous dispersion and depends on both the composition of the glass and the wavelengths $x$ and $y$. When the $Dx,y$ of normal optical glass is plotted against the $vd$, the linear relationships I and II are almost satisfied as shown by the optical glasses marked with white circles in FIGS. 1 and 2.

$\Delta Dx,y$ can be regarded as almost zero and these glasses can be called normal dispersion optical glasses. It is noted that in FIG. 1, the $d$ line and C line are used as $x$ and $y$, respectively and in FIG. 2 the $g$ line and F line are employed as $x$ and $y$, respectively. The linear relationship that represents normal dispersion optical glass is obtained by putting $\Delta Dx,y + 0$ in the above-mentioned formula (2). This approximates the straight line connecting the two points equivalent respectively to a crown glass $Nd = 1.5111$ and $vd = 60.5$ and to a flint glass $Nd = 1.6200$ and $vd = 36.8$, the typical normal dispersion optical glass, $Dd, C$ and $Dg, F$ are given respectively by $$Dd, C = 0.2765 + 0.0004555 \, vd \brace Dg, F = 0.6449 - 0.001681 \, vd \quad (3)$$

These formulae represent the straight line I shown in FIG. 1, and the straight line II shown in FIG. 2, respectively.

The anomalous dispersion $\Delta Dx,y$ of a certain optical glass is equal to the vertical distance between a point corresponding to the said optical glass and the straight lines represented by the formulas (3) in FIGS. 1 and 2.

Optical glasses represented with white circles are optical glasses available on the market having the same $Nd$ and $vd$ as in the present invention. They are closely matched with the straight lines of the formulas (3) and can be called normal dispersion optical glasses. The black triangles represent optical glasses available on the market, manufactured especially as anomalous dispersion optical glasses. They are greatly off the straight lines and have an extremely poor weatherproof characteristic. The black circle markings represent the optical glasses according to this invention (examples will be described later). They have a sufficient anomalous dispersion and weatherproof characteristics to be put into practice.

In optical design, at least one anomalous dispersion optical glasses needed in designing a so-called extremely achromatic lens (apochromat) in which the secondary spectrum is corrected, that is, which has the same refractive index against three different wavelengths. Furthermore, it is advantageous for a flint glass such as the lead-containing glass according to this invention which has a comparatively large dispersion (small $vd$) to show anomalous dispersion at as large dispersion as possible and to have the signs of the anomalous dispersion as $\Delta Dd,C > 0$ and $\Delta Dg,F < 0$. The reason why the lower limit of PbO was decided as 25 weight percent in the above-mentioned composition ranges is that if the amount of PbO is less than the above-mentioned value dispersion becomes small and does not meet the above-mentioned requirements. In another method of indication, the anomalous dispersion is expressed by $\Delta vd$, the deviation of $vd$ from the straightline at the same $Dx,y$ on the $Dx,y - vd$ chart, but there is no big difference between this method and the method employed in this specification. The selection of wave lengths for $\Delta Dx,y$ depends on the specifications of the optical equipment that uses the glass. But they are represented in most cases by $\Delta Dd,C$ and $\Delta Dg,F$ which contain the $d$ line and $g$ line most widely used. Two methods for testing chemical resistance of glasses are known in general; one is the powder method by which the solubility of the powdered glass into an acid or base is examined and the other, the surface method by which a comparatively wide surface of a piece of glass undergoes examination. It is considered that the surface method is correlated with actual practice taking into account the weathering which is formed in the process of optical lens manufacture.

The method for testing weather proof characteristic and for representation of the results shown in examples will be roughly described. A glass specimen polished into a 30 mm. square with 3 mm. thickness, is placed for 3 weeks in a box where the 100 percent relative humidity is kept and a temperature is cycled from 57.5° C. to 62.5° C. in 2 hours, so that dews appear on and disappear from the specimen, alternately Then the weathering produced the surface of the specimen was measured with the hazemeter. The degree of the weathering was classified into the following 7 grades according to the haze percentage.

| Grade | 1 | 2 | 3 | 4 | 5 | 6 | 7 |
|---|---|---|---|---|---|---|---|
| Haze percent | 0~2.5 | 2.6~5.0 | 5.1~10.0 | 10.1~20.0 | 20.1~40.0 | 40.1~60.0 | 60.1~ |

This shows that the haze percentage is greater and the weather proof characteristic is more degraded the greater the grade number is. In practice, it is satisfactory for the weather-proof characteristic to be of 3rd grade or less.

The examples of this invention will be shown in the next table. In this table, the composition (in weight percent), $Nd$, $vd$, $\Delta Dd,C$, $\Delta Dg,F$, and weatherproof characteristic of each example are shown. The last two columns are offered to the anomalous dispersion optical glasses A and B available on the market for purposes of comparison.

| | Example Nos. | | | | | | | | | |
|---|---|---|---|---|---|---|---|---|---|---|
| | 1 | 2 | 3 | 4 | 5 | 6 | 7 | 8 | 9 | 10 |
| Composition: | | | | | | | | | | |
| $B_2O_3$ | 20 | 20 | 10 | 30 | 20 | 30 | 20 | 30 | 30 | 29 |
| $SiO_2$ | 45 | 40 | 40 | 30 | 30 | 20 | 20 | 10 | 20 | 9 |
| PbO | 25 | 30 | 40 | 30 | 40 | 40 | 50 | 50 | 37 | 44 |
| $Al_2O_3$ | 10 | 10 | 10 | 10 | 10 | 10 | 10 | 10 | 8 | 12 |
| $La_2O_3$ | | | | | | | | | 3 | |
| MgO | | | | | | | | | | 2 |
| CaO | | | | | | | | 2 | | 2 |
| SrO | | | | | | | | | | 2 |
| BaO | | | | | | | | | | |
| ZnO | | | | | | | | | | |
| CdO | | | | | | | | | | |
| $As_2O_3$ | 0.3 | 0.3 | 0.3 | 0.3 | 0.3 | 0.3 | 0.3 | 0.3 | 0.3 | 0.3 |
| $Nd$ | 1.53697 | 1.55610 | 1.58938 | 1.56152 | 1.60012 | 1.61074 | 1.66227 | 1.67056 | 1.62224 | 1.67516 |
| $vd$ | 48.1 | 46.9 | 41.7 | 46.8 | 41.9 | 42.1 | 37.1 | 37.5 | 42.9 | 39.4 |
| $\Delta Dd,C$ | 0.002 | 0.003 | 0.003 | 0.003 | 0.003 | 0.003 | 0.002 | 0.003 | 0.003 | 0.003 |
| $\Delta Dg,F$ | −0.011 | −0.010 | −0.007 | −0.011 | −0.007 | −0.009 | −0.005 | −0.007 | −0.009 | −0.007 |
| Weather proof grade | 1 | 1 | 1 | 1 | 1 | 1 | 1 | 2 | 1 | 1 |

| | Example Nos. | | | | | | | | |
|---|---|---|---|---|---|---|---|---|---|
| | 11 | 12 | 13 | 14 | 15 | 16 | 17 | A | B |
| Composition: | | | | | | | | | |
| $B_2O_3$ | 39 | 37 | 39 | 35.5 | 35 | 31 | 28 | | |
| $SiO_2$ | 25 | 18 | 14 | 12.5 | 10 | 6 | 5 | | |
| PbO | 20 | 25 | 30 | 34 | 40 | 50 | 50 | | |
| $Al_2O_3$ | 10 | 12 | 12 | 12 | 10 | 8 | 10 | | |
| $La_2O_3$ | 3 | 2 | | 2 | | 3 | 3 | | |
| MgO | | 2 | | | 2 | | 1 | | |
| CaO | 3 | 2 | 3 | 3 | 3 | | 2 | | |
| SrO | | | | 1 | | | | | |
| BaO | | | | | | | 1 | | |
| ZnO | | 2 | | | | 2 | | | |
| CdO | | | 2 | | | | | | |
| $As_2O_3$ | 0.3 | 0.3 | 0.3 | 0.3 | 0.3 | 0.3 | 0.3 | | |
| $Nd$ | 1.55241 | 1.58931 | 1.59804 | 1.61140 | 1.64480 | 1.70403 | 1.72547 | 1.57510 | 1.61340 |
| $vd$ | 46.7 | 48.2 | 45.9 | 44.6 | 41.1 | 36.6 | 34.7 | 51.9 | 44.3 |
| $\Delta Dd,C$ | 0.004 | 0.004 | 0.004 | 0.004 | 0.003 | 0.002 | 0.002 | 0.0041 | 0.0036 |
| $\Delta Dg,F$ | −0.013 | −0.011 | −0.011 | −0.012 | −0.009 | −0.007 | −0.005 | −0.0089 | −0.0098 |
| Weather proof grade | 2 | 2 | 3 | 3 | 2 | 2 | 2 | 7 | 5 |

FIG. 1 shows a chart in which the numerical values of the above-mentioned examples are plotted, taking the partial dispersion ratio $Dd,C$ on the vertical axis and the Abbe number $vd$ on the horizontal axis. FIG. 2 shows a chart in which the numerical values of the above-mentioned examples are plotted, taking the partial dispersion ratio $Dg,F$ on the vertical axis and the Abbe number $vd$ on the horizontal axis. In both drawings, the numbers with black circles and the symbols with black triangles show respectively the example numbers and the symbols represented in the table hereinbefore.

What is claimed is:

1. An anomalous dispersion optical glass having a good weatherproofing characteristic consisting essentially in weight percent of:

| | | |
|---|---|---|
| $SiO_2$ | = | 3–45 |
| $Al_2O_3$ | = | 8–12 |
| $La_2O_3$ | = | 0–8 |
| RO | = | 0–8 |
| $B_2O_3$ | = | 10–40 |
| PbO | = | 25–60 |

$SiO_2 + 25 \geq B_2O_3 \geq 30 \frac{1}{2} SiO_2$ $SiO_2 + 20 \geq B_2O_3 \geq 35$ wherein at least 3 to 8 percent of PbO is replaced with at least one oxide selected from the group consisting of RO, $La_2O_3$ and mixtures thereof and RO is a bivalent metal oxide other than PbO and selected from MgO, CaO, SrO, BaO, ZnO, CdO, and mixtures thereof and $Nd = 1.52$–$1.74$ and $Vd = 33$–$52$.

2. An anomalous dispersion optical glass having a good weatherproof characteristic consisting essentially in weight per cent of:

| | | |
|---|---|---|
| $SiO_2$ | = | 3–45 |
| $Al_2O_3$ | = | 8–12 |
| $La_2O_3$ | = | 0–8 |
| RO | = | 0–8 |
| $B_2O_3$ | = | 10–40 |
| PbO | = | 25–60 |

$SiO_2 + 25 \geq B_2O_3 \geq 30 \frac{1}{2} SiO_2$ $B_2O_3 > SiO_2 + 20$ wherein at least 3 to 8 percent of PbO is replaced with at least one oxide selected from the group consisting of RO, $La_2O_3$ and mixtures thereof and RO is bivalent metal oxide other than PbO and selected from MgO, CaO, SrO, BaO, ZnO, CdO and mixtures thereof and $Nd = 1.52$–$1.74$ and $Vd = 33$–$52$.

3. An anomalous dispersion optical glass according to claim 1, wherein RO is CaO.

4. An anomalous dispersion optical glass according to claim 2 wherein RO is CaO.

* * * * *

PO-1050
(5/69)

UNITED STATES PATENT OFFICE
CERTIFICATE OF CORRECTION

Patent No. 3,653,933     Dated April 4, 1972

Inventor(s) Munehisa Tsunekawa

It is certified that error appears in the above-identified patent and that said Letters Patent are hereby corrected as shown below:

In the Abstract: that portion of the formula reading $$SiO_2 + 25 \geq B_2O_3 \geq 30 \; 1/2 \; SiO_2 \quad \text{should read}$$

$$SiO_2 + 25 \geq B_2O_3 \geq 30 - 1/2 \; SiO_2.$$

Column 1 line 50, that portion of the formula reading $$SiO_2 + 25 \geq B_2O_3 \geq 30 \; 1/2 \; SiO_2 \quad \text{should read}$$

$$SiO_2 + 25 \geq B_2O_3 \geq 30 - 1/2 \; SiO_2.$$

Column 5 line 22, that portion of the formula reading $$SiO_2 + 25 \geq B_2O_3 \geq 30 \; 1/2 \; SiO_2 \quad \text{should read}$$

$$SiO_2 + 25 \geq B_2O_3 \geq 30 - 1/2 \; SiO_2.$$

Column 6 line 13, that portion of the formula reading $$SiO_2 + 25 \geq B_2O_3 \geq 30 \; 1/2 \; SiO_2 \quad \text{should read}$$

$$SiO_2 + 25 \geq B_2O_3 \geq 30 - 1/2 \; SiO_2.$$

Signed and sealed this 27th day of March 1973.

(SEAL)
Attest:

EDWARD M. FLETCHER, JR.　　　　　ROBERT GOTTSCHALK
Attesting Officer　　　　　　　　Commissioner Of Patents